(12) United States Patent
Thannhauser (10) Patent No.: US 11,484,854 B2
(45) Date of Patent: Nov. 1, 2022

(54) CLOSURE DEVICE FOR A BULK MATERIALS SYSTEM

(71) Applicant: Concord Blue Patent GmbH, Dusseldorf (DE)

(72) Inventor: Christopher Thannhauser, Dusseldorf (DE)

(73) Assignee: Concord Blue Patent GmbH, Dusseldorf (DE)

( * ) Notice: Subject to any disclaimer, the term of this patent is extended or adjusted under 35 U.S.C. 154(b) by 128 days.

(21) Appl. No.: 17/261,316

(22) PCT Filed: Jul. 15, 2019

(86) PCT No.: PCT/EP2019/068983
§ 371 (c)(1),
(2) Date: Jan. 19, 2021

(87) PCT Pub. No.: WO2020/016168
PCT Pub. Date: Jan. 23, 2020

(65) Prior Publication Data
US 2021/0308643 A1   Oct. 7, 2021

(30) Foreign Application Priority Data
Jul. 20, 2018   (DE) .......................... 102018117675.9

(51) Int. Cl.
*B01J 6/00*    (2006.01)
*B65D 90/58*   (2006.01)

(52) U.S. Cl.
CPC ............ *B01J 6/008* (2013.01); *B65D 90/582* (2013.01)

(58) Field of Classification Search
CPC ........... B01J 6/008; B65D 90/582; F16K 3/22
(Continued)

(56) References Cited

U.S. PATENT DOCUMENTS 508,307 A   11/1893   Haagen
998,393 A    7/1911   Reeder
(Continued)

FOREIGN PATENT DOCUMENTS

DE   1029289 B    4/1958
DE   3311655 A1  10/1984
(Continued)

OTHER PUBLICATIONS

Machine translation of DBP-1029289 (Year: 2022).*
(Continued)

*Primary Examiner* — Huy Tram Nguyen
(74) *Attorney, Agent, or Firm* — Wood Herron & Evans LLP (57) ABSTRACT

A closure device for a bulk material system is provided, specifically for regulating a flow of heat transfer particles. The closure device includes a bulk material guide which has a first opening for connection to the bulk material system and a second opening for the discharge of a bulk material guided by the bulk material system, and a closure blade which is rotatably mounted about an axis of rotation. The closure blade, in a first rotational position, closes the second opening and, in a second rotational position, at least partially uncovers the second opening. The closure blade is mounted in such a manner to reduce jamming of the closure device in operation.

9 Claims, 3 Drawing Sheets

(58) Field of Classification Search
USPC .......................................................... 422/164
See application file for complete search history.

(56) References Cited

U.S. PATENT DOCUMENTS

| | | | |
|---|---|---|---|
| 1,902,863 A | 3/1933 | Kersting | |
| 4,046,268 A | 9/1977 | Adler | |
| 4,574,989 A | 3/1986 | Pole | |
| 2011/0201854 A1* | 8/2011 | Kocal | C01B 3/323 |
| | | | 585/240 |

FOREIGN PATENT DOCUMENTS

| | | | |
|---|---|---|---|
| DE | 19945771 C1 | | 2/2001 |
| DE | 10055360 A1 | | 6/2002 |
| DK | 1029289 | * | 4/1952 |
| FR | 638405 A | | 5/1928 |
| GB | 576383 A | * | 10/1943 |
| GB | 576383 A | | 4/1946 |
| JP | S6430634 A | | 2/1989 |
| WO | 03106937 A1 | | 12/2003 |

OTHER PUBLICATIONS

International Searching Authority, Search Report and Written Opinion issued in PCT/EP2019/068983 dated Nov. 7, 2019 with partial English translation (20 pages).
International Searching Authority, Written Opinion issued in PCT/EP2019/068983 dated Jun. 3, 2020 (7 pages).
International Searching Authority, International Preliminary Report on Patentability issued in PCT/EP2019/068983 dated Sep. 15, 2020 (50 pages).
German Patent Office, First Office Action issued in DE 10 2018 117 675.9, dated Feb. 15, 2019 (5 pages).
German Patent Office, Second Office Action issued in DE 10 2018 117 675.9, dated May 29, 2020 (2 pages).

* cited by examiner

CLOSURE DEVICE FOR A BULK MATERIALS SYSTEM

CROSS-REFERENCE TO RELATED APPLICATIONS

This application is a national phase entry of, and claims priority to, International Application No. PCT/EP2019/068983, filed Jul. 15, 2019, which claims priority to German Patent Application No. 10 2018 117 675.9, filed Jul. 20, 2018. The above-mentioned patent applications are incorporated herein by reference in their entireties.

TECHNICAL FIELD

This application relates to a closure device for a bulk material system, such as a bulk material container or conveying line, and also relates to a use of such a closure device.

BACKGROUND

In order to close silo openings, flap type systems are known which open substantially along the direction of outflow of material flowing out of the silo under the influence of gravity. Closing them can be problematic, as they have to be closed against the flow of material.

This problem is obviated by segment or crescent type closures, as they are referred to, in which a sliding blade is inserted into the material flow at least substantially perpendicular to the direction of movement of the material in order to close the silo opening. In this context, the sliding member is usually pivoted into the material flow by a rotational movement. Such segment closures work quite reliably with bulk materials that have very small particle diameters compared to the diameter of the silo opening.

However, with larger particle diameters, such as one hundredth of the diameter of the silo opening or larger, in particular one tenth of the diameter of the silo opening or larger, problems can arise when the sliding member is being opened, in particular if the bulk material comprises particles with a rough surface and/or particles which are irregularly shaped and which tend to get stuck. In particular, jamming of the sliding blade can occur because particles from a material layer in the region of the sliding blade must be moved, for example rotated and/or displaced, during opening. This movement can be inhibited by adjacent particles or by a housing wall. The inhibiting action acts as a counterforce on the movement of the sliding blade and can be so great that the sliding blade is jammed and cannot be pivoted to a sufficient extent.

A closure is known from CH 568 217 in which a closure member in the form of a sliding member runs in a guide and is held, under pressure, in contact with an outlet portion of a closure housing by a device for ensuring proper sealing. In this case, the sliding member lies below the closure housing in a horizontal plane between the closure housing and a thrust ring, while outside the closure housing it extends in a pivoting region of a lever arm in an arc about a pivoting axis. In order to open the sliding member, the lever arm is pivoted, whereby, already at the start of this pivoting movement, a control member slides away under inclined surfaces of levers, as a result of which the thrust ring is relieved of the sealing pressure.

It would therefore be desirable to improve the closing of bulk material systems, and to reduce the risk of jamming of a closure device.

SUMMARY

To address these and other problems with the conventions designs, a closure device for a bulk material system is provided in one embodiment, in particular for a bulk material container and/or a bulk material conveying line. The closure device includes a bulk material guide in the form of a hollow body which has a first opening for connection to the bulk material system and a second opening for the discharge of a bulk material guided by the bulk material system, and a closure blade which is rotatably mounted about an axis of rotation and which closure blade, in a first rotational position, closes the second opening and which closure blade, in a second rotational position, at least partially uncovers the second opening. In this context, the closure blade is mounted in such a way that, during its rotation about the axis of rotation in order to be transferred from the first rotational position to the second rotational position, a first point on a first edge of the closure blade, which first edge, with respect to the direction of movement, is located at a foremost position, moves on a first curve of movement, preferably a circular curve of movement, and a second point on the closure blade which, as regards its spatial position with respect to the direction of movement, is located behind the first point, moves on a second curve of movement, preferably a circular curve of movement, which, at least in portions, is at a greater distance from the axis of rotation than the first curve of movement. During the movement along the first and second trajectory curves, the first and the second point each have a movement component that is tangential to the closure blade.

In this context, the second point is preferably located on a second edge of the closure blade which, during the transfer from the first rotational position to the second rotational position, is located at a rearmost position with respect to the direction of movement of the closure blade.

In this context, the movement of the closure blade during the transfer from the first rotational position to the second rotational position or vice versa corresponds, in a preferred manner, to a combination of a crescent type movement, as it is known from conventional segment closures, and a flap type or lowering movement, as it is known from conventional flap type closures. The movement of the closure blade during rotation about the axis of rotation, during which the first point moves on the first curve of movement and the second point moves on the second curve of movement, can also be referred to as the line of movement of the closure blade.

The component of the crescent type movement in the line of movement of the closure blade allows the closure blade to be introduced, at least approximately, without any resistance, into a flow of bulk material emerging from the second opening, or to interrupt this flow of bulk material. In particular, the crescent type movement of the closure blade can take place in such a way that a portion of the closure blade can be introduced into the flow of bulk material in a direction which is, at least substantially, perpendicular to the direction in which the bulk material emerges from the second opening. As a result, the second opening can be closed reliably even in the case of large columns of material in the bulk material guide or in the bulk material system.

On the other hand, the component of the flap type movement in the line of movement of the closure blade allows the closure blade, when the second opening is being uncovered, to be moved away from the second opening in such a way that a contact, in particular a frictional contact, between particles of the bulk material in the region of the closure blade and the closure blade is reduced, in particular interrupted. By this, the risk of jamming of the closure blade can at least be reduced when the second opening is being uncovered.

In other words, as a result of the rotational movement about the axis of rotation when the closure device is opened, i.e. when the second opening of the bulk material guide is uncovered or when the closure blade is transferred from the second rotational position to the first rotational position, the closure blade also performs a lowering movement with respect to the second opening, as a result of which the particles of the bulk material which are located in the region of the closure blade are relieved. In particular, the particles of the bulk material can thus be given more space for rotational and/or translational movements during opening, and thus the friction between the particles and the closure blade can be reduced. In this way, the risk of jamming of the closure blade during opening can be reduced.

The closure device according to embodiments of the invention can be used, for example, to equip bulk material containers, such as silos, and/or bulk material conveying lines, such as chutes or downpipes, in order to control the discharge or the mass flow rate of bulk material. For this purpose, the bulk material guide is preferably connected to the corresponding bulk material system, such as the bulk material container or the bulk material conveying line, in order to guide the bulk material through the closure device and thus to enable, for example, metering of the bulk material by the closure blade.

Overall, this and other embodiments of the invention allow for improved movement of a closure blade during opening and/or closing of bulk material systems, in particular for a reduced risk of jamming of the closure blade.

In the following, certain preferred embodiments of the invention and further developments thereof will be described, each of which, as far as this is not expressly excluded, can be combined in any desired manner with one another, as well as with the other features of the invention which are described below.

In some embodiments, the spatial position of the axis of rotation is fixed, in particular with respect to the bulk material guide. As a result of this, the first point and the second point on the closure blade, in particular all points on the closure blade, can move on circular curves of movement.

In this context, the axis of rotation can be arranged approximately on a longitudinal axis of the bulk material guide. Alternatively, the axis of rotation can however also be arranged next to the bulk material guide, i.e. in such a way that it does not intersect the bulk material guide or does not pass through the bulk material guide. The spatial position of the axis of rotation can, for example, be chosen in dependence upon the available installation space in order to enable the closure device to be constructed in a compact manner.

Alternatively, in some embodiments, the axis of rotation may be movably mounted so that it changes its position in space, in particular with respect to the bulk material guide, when the closure blade is rotated. For example, the axis of rotation may be movably mounted along a longitudinal axis of the bulk material guide. By this, the first and the second point on the closure blade, in particular all points on the closure blade, can move on non-circular curves of movement. The line of movement of the closure blade can thus be adapted to the loads acting on the closure blade. In some embodiments, the second opening of the bulk material guide forms a seal seat for the closure blade against which the closure blade rests in the second rotational position. In this regard, the movement of the closure blade which is dictated by the first and second trajectory curves, in particular by movement components of the first and second points which are oriented perpendicular to the closure blade during the movement respectively along the first and second trajectory curves, may allow the closure blade to lift from its seal seat when the closure device is opened. In particular, a gap, preferably having a gap width that is at least substantially uniform along the gap, may form between the seal seat and the closure blade when the closure device is opened. This can enable the bulk material to move forward in the region of the closure blade and thus reduce the frictional forces acting on the closure blade, which frictional forces influence a movement of the closure blade perpendicular to the direction of emergence of the bulk material from the second opening. In particular, by the particular line of movement of the closure blade, a situation can be avoided where a rotation and/or a translation of individual particles of the bulk material which are in contact with the closure blade, in particular in frictional contact with the closure blade, is forced to take place, the rotation and/or translation causing frictional forces.

In some embodiments, the closure blade is arranged with respect to the axis of rotation in such a way that a distance between the second point on the closure blade and the axis of rotation is greater than a distance between the first point on the closure blade and the axis of rotation. In this context, the first curve of movement preferably corresponds to a circle the radius of which corresponds to the distance between the first point on the closure blade and the axis of rotation. The second curve of movement preferably corresponds to a circle the radius of which corresponds to the distance between the second point on the closure blade and the axis of rotation. In this way, it is possible to ensure, in a simple manner, that, at all times, the second curve of movement is at a greater distance from the axis of rotation than the first curve of movement, and that, accordingly, the line of movement of the closure blade corresponds to a crescent type movement with a lifting movement relative to the second opening.

The closure blade can be connected to the axis of rotation via a pivot arm, for example. In this context, the pivot arm is preferably constructed in such a way, and/or the closure blade is connected to the pivot arm in such a way, or is constructed with respect to the pivot arm in such a way, that a greater distance is formed between the axis of rotation and the second point on the closure blade than between the axis of rotation and the first point on the closure blade.

The distance between the first point on the closure blade and the axis of rotation is preferably between 5 and 50 cm, preferably between 10 and 40 cm, in particular between 15 and 30 cm. The distance between the second point on the closure blade and the axis of rotation is preferably between 10 and 60 cm, preferably between 15 and 50 cm, in particular between 20 and 40 cm. In this context, the distance between the first point on the closure blade and the axis of rotation is preferably between 50 and 95%, preferably between 60 and 90%, in particular between 70 and 85% of the distance between the second point on the closure blade and the axis of rotation. By this, a reliable closing of the second opening of the bulk material guide, as well as a movement of the closure blade without jamming, can be achieved particularly well.

In a further preferred embodiment, the closure blade, which is connected to the axis of rotation in particular via a pivot arm, is curved or deformed in such a way that the distance between the second point on the closure blade and the axis of rotation is greater than the distance between the first point on the closure blade and the axis of rotation. Preferably, the closure blade is curved with respect to the axis of rotation in a concave manner. In addition to an improved ability of the closure blade to be pivoted, in particular in an unimpeded manner, the curvature can also result in an advantageous distribution of force on the closure blade during closing and/or uncovering of the second opening of the bulk material guide, so that friction occurring between the bulk material and the closure blade is reduced during closing and/or uncovering, and thus the closing and/or uncovering is facilitated.

In the sense of this application, a curvature which is concave with respect to the axis of rotation is a curvature according to which the closure blade is curved, at least in portions, in the direction of the axis of rotation.

For this purpose, the closure blade can, for example, be curved and/or arranged, in particular with respect to the axis of rotation, in such a way that, when it is introduced into a flow of bulk material emerging from the second opening, a portion of the closure blade in the region of the second point on the closure blade is aligned at least substantially perpendicularly to the direction of emergence of the bulk material from the second opening, while at least one further portion of the closure blade in the region of a further point on the closure blade, in particular in the region of the first point on the closure blade, is inclined with respect to the direction of emergence. As a result, at the beginning, the closure blade can be introduced into the flow of bulk material particularly easily, while the closure blade leaves a particularly large amount of space for the bulk material due to the curvature in the at least one further portion when the second opening is uncovered.

In this context, it is conceivable to provide the closure blade with a varying curvature between the first point and the second point on the closure blade. For example, departing from the second point, the curvature may increase towards the first point, in particular in a continuous manner. The curvature of the closure blade may for example follow, at least in portions, a parabolic branch-like course, whereby the extreme point of the corresponding parabola is preferably located in the region of the second point on the closure blade, i.e. preferably in the region of the second edge. For example, the closure blade can, at least in portions, be curved according to the function $f(x)=ax^2+bx+c$, with $x \geq 0$. Alternatively, the curvature of the closure blade may also be curved, at least in portions, according to a higher polynomial. However, a linear or a constant curvature is also conceivable.

In some embodiments, the closure blade is curved and/or arranged with respect to the axis of rotation in such a way that, during rotation about the axis of rotation, the closure blade sweeps through a region of space that is at least substantially entirely between the first trajectory curve and the second trajectory curve. In particular, the distance between the first point on the closure blade and the axis of rotation may correspond to a minimum distance between the closure blade and the axis of rotation, and the distance between the second point on the closure blade and the axis of rotation may correspond to a maximum distance between the closure blade and the axis of rotation, in particular when the second point is located on the second edge of the closure blade. In other words, the closure blade is arranged completely between the first and the second trajectory curves, in particular independently of the rotational position. On the one hand, this makes it possible to ensure that the closure blade can fully uncover the second opening without the closure blade hitting the edge of the second opening. On the other hand, this allows the closure blade to provide a column of bulk material resting above the closure blade with room to move, over, at least substantially, the entire area of the closure blade when the second opening is uncovered, i.e. the closure blade can lift off evenly.

In some embodiments, the bulk material guide is constructed in such a way that the distance between a second point on an edge of the second opening and the axis of rotation is greater than the distance between a first point on the edge of the second opening and the axis of rotation, wherein, in the first rotational position of the closure blade, the first point on the edge of the second opening corresponds to the second point on the closure blade, and, in the first rotational position of the closure blade, the second point on the edge of the second opening corresponds to the first point on the closure blade. In this way, when the closure blade is transferred from the first rotational position to the second rotational position, any bulk material in the area of the closure blade can be given enough space in order to reduce the friction between the bulk material and the closure blade, and thus to reduce the likelihood of jamming of the closure blade to occur.

In these embodiments, when the closure blade is rotated out of the first rotational position, the second point on the closure blade moves from the second point on the edge of the second opening towards the first point on the edge of the second opening. Therefore, due to the reduced distance between the first point on the edge of the second opening and the axis of rotation, the distance between the closure blade, in particular a portion of the closure blade in the region of the second point on the closure blade, and the second opening, in particular a portion in the region of the first point on the edge of the second opening, increases during the rotation. In other words, during the rotation of the closure blade out of the first rotational position, a gap is formed between the second opening and the closure blade so that bulk material resting on the closure blade does not have an inhibiting effect on the closure blade.

In some embodiments, the bulk material guide, in particular the second opening, and/or the closure blade is or are constructed in such a way that a shape of the second opening corresponds, at least in portions, with a shape of the closure blade, in particular with the curvature thereof. The bulk material guide, in particular the second opening, and/or the closure blade may be constructed in such a way that a shape of the second opening corresponds with a shape of the closure blade, in particular with the curvature thereof, at least over a portion of the closure blade. In this context, the shape of the second opening and the shape of the closure blade can be matched to each other in such a way that the closure blade can be lifted off from, or be placed on, the second opening, at least substantially uniformly, in particular over the entire area of the closure blade. At the same time, this enables a tight closure of the second opening by the closure blade to be achieved, as well as a pivoting of the closure blade without jamming.

For example, the closure blade can be constructed larger than the second opening of the bulk material guide, so that, in the first rotational position, when the second opening is being closed, the bulk material guide projects beyond the second opening. In this context, in a preferred manner, the shape of the second opening corresponds to the curvature of the closure blade in that portion of the closure blade which covers the second opening or which prevents the bulk material from emerging from the second opening.

In some embodiments, the second opening as well as the closure blade each have a curvature. In this context, a radius of curvature of the curved second opening is smaller than a radius of curvature of the curved closure blade. As a result of this, in the first rotational position, i.e. in the closed condition, a gap may be formed between the second opening and the closure blade, which may prevent shearing of the bulk material when the closure blade is transferred from the second rotational position to the first rotational position, i.e. when the second opening is being closed, or at least reduce the risk of shearing.

In a further preferred embodiment, the bulk material guide has a longitudinal axis. The axis of rotation is preferably arranged in such a way that it does not intersect the longitudinal axis. In particular, the axis of rotation can be arranged eccentrically with respect to the bulk material guide. This not only allows the closure blade to be lifted off when it is pivoted out of the first rotational position, but also saves installation space, since, in this way, the closure blade can be guided particularly close to the bulk material guide.

In a further preferred embodiment, the bulk material guide is interchangeable for controlling a maximum mass flow rate of bulk material through the bulk material guide. In a preferred manner, the closure device comprises a connecting element for this purpose, such as a connecting flange, a coupling and/or the like, with the aid of which the bulk material guide can be exchanged, for example connected to a bulk material container, a downpipe or a chute. Preferably, different bulk material guides with different diameters and/or shapes can be used in this way, in dependence upon the desired maximum bulk material mass flow rate. This allows the closure device to be used in a flexible manner.

In this context, an at least substantially round bulk material guide is preferably used. Alternatively, however, bulk material guides of polygonal, in particular rectangular, oval or any other shape can also be used.

In further embodiments, a use of a closure device as described above is provided for regulating a heat transfer particle flow, by which a temperature and/or a heat demand within the framework of a thermal conversion process and/or a filling level in a bulk material system, in particular in a component of the bulk material system, is adjusted. The closure device permits a particularly targeted control of the chemical processes taking place in this context.

One or more closure devices can be used, for example, in a device or a system for generating a product gas on the basis of gasification of a carbonaceous starting material, in particular biomass. In this context, a flow of bulk material of heat transfer particles is regulated by the closure devices in an advantageous manner.

For example, the heat transfer particles can be preheated to a reforming temperature in a preheater by flowing hot exhaust gases through a bed of the heat transfer particles arranged on a closure device of the preheater. Preferably, at least a part of the heated heat transfer particles are transferred in a metered manner to a reformer arranged below the preheater, on the base of which, in particular on a further closure device of the reformer, the heated heat transfer particles can form a further bed. A pyrolysis gas generated during a thermal decomposition of the starting material can be flowed through the bed in the reformer, whereby, in a preferred manner, the product gas is generated at the reforming temperature. The heat transfer particles at the base of the reformer thereby cool down to a pyrolysis temperature and can be transferred in a metered manner to a pyrolysis reactor arranged below the reformer. There, the heat transfer particles can thermally decompose the starting material at the pyrolysis temperature before they are discharged, preferably via a further closure device of the pyrolysis reactor, after which they can be conveyed back into the preheater.

If, for example, the temperature in the reformer drops, heat transfer particles can be added from the preheater in a targeted manner in order to raise the temperature in the reformer back to the reforming temperature, or to keep it constant there. The same also applies to the temperature in the pyrolysis reactor, whereby, here, heat transfer particles can be added from the reformer in a targeted manner.

If, on the other hand, the amount of heat transfer particles in the reformer becomes too high so that the temperature rises too much, heat transfer particles can, if necessary, be discharged from the reformer via the closure device in order to reduce the thermal energy which is present in the reformer.

If, for example, a larger quantity of carbonaceous starting material is fed to the pyrolysis reactor, additional heat transfer particles must, as a rule, also be added. This also applies if the chemical composition of the starting material changes in such a way that additional heat energy is required for thermal decomposition.

With the aid of the closure device, the mass flow rate and/or the circulation of heat transfer particles in a thermal conversion process can, in a preferred manner, be regulated as required, e.g. by controlling the period of time for which the closure blade keeps the second opening closed and/or uncovered. By this, it is possible, for example, to regulate at least one conversion temperature, such as the reforming temperature and/or the pyrolysis temperature, and thus to adapt it to the requirements of the method.

The features and advantages which have been described in relation to the first embodiments of the invention also apply, at least where this makes technical sense, to the second embodiments of the invention, as well as vice versa.

BRIEF DESCRIPTION OF THE DRAWINGS

Further advantages, features and possible applications of the present invention will be apparent from the following description in connection with the figures, in which the same reference signs are used throughout for the same or mutually corresponding elements of the invention. The accompanying drawings, which are incorporated in and constitute a part of this specification, illustrate one or more embodiments of the invention and, together with the general description given above and the detailed description given below, explain the one or more embodiments of the invention.

DETAILED DESCRIPTION

Figure 1:
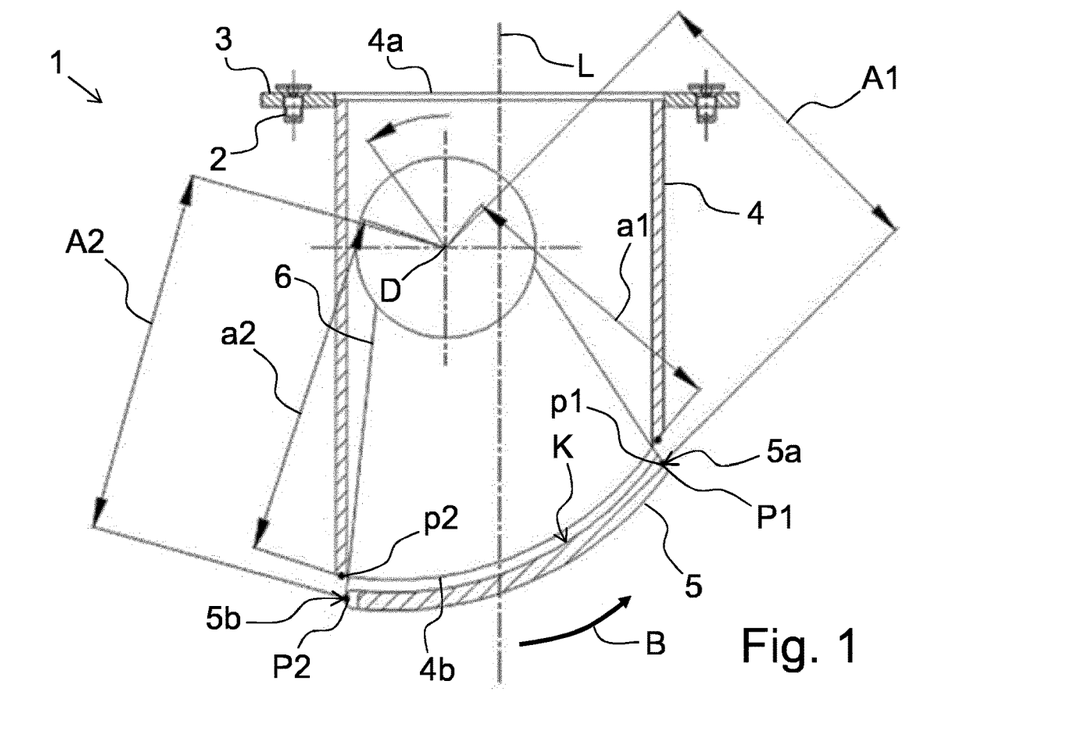
FIG. 1 is a cross-section view of one embodiment of a closure device in accordance with the invention.

FIG. 1 shows, in cross-section, a preferred embodiment of a closure device 1 in accordance with the invention. In this example, the closure device 1, in particular a bulk material guide 4 of the closure device 1, is connected to a bulk material container 3 with the aid of a connecting element 2, such as screws, in particular in a non-destructible manner. In the same way, the bulk material guide could also be connected to a different component of a bulk material system, such as a downpipe or a chute. In this context, the bulk material guide 4 is constructed as a hollow body and has a first opening 4a for connection to the bulk material container 3 and a second opening 4b, in particular a second opening 4b which is opposite the first opening 4a, for discharging bulk material from the bulk material container 3.

A closure blade 5 of the closure device 1 is pivotably mounted about an axis of rotation D, in particular a spatially fixed axis of rotation D, so that, as shown in FIG. 1, it can close the second opening 4b in a first rotational position, in particular completely and/or sealingly with respect to the bulk material. In this context, the closure blade 5 is connected to the axis of rotation D via a pivot arm 6, in particular a rigid pivot arm 6 (also referred to as a lever arm 6 herein).

The closure blade 5 has a first edge 5a and a second edge 5b which is opposite the first edge 5a. When the closure blade 5 is rotated about the axis of rotation D out of the first rotational position, in particular when the closure blade 5 is transferred from the first rotational position to a second rotational position shown in FIG. 2, in which the second opening 4b is at least partially uncovered, the first edge 5a is located at a foremost position in a direction of movement B. In a corresponding manner, the second edge 5b is located at a rearmost position.

The closure blade 5 is arranged, in particular aligned, relative to the axis of rotation D in such a way that a first point P1 on the first edge 5a is at a distance A1 from the axis of rotation D that is smaller than a distance A2 of a second point P2 on the second edge 5b from the axis of rotation D. For example, the closure blade 5 may be attached to the pivot arm 6 in an inclined or tilted manner in order to put into effect the different distances A1, A2 of the first and second points P1, P2 from the axis of rotation D, respectively. In particular, the closure blade 5 can be arranged eccentrically with respect to the axis of rotation D, in particular mounted eccentrically on the pivot arm 6.

Alternatively or additionally, the different distances A1, A2 can also be put into effect by a curvature K of the closure blade 5. The closure blade 5 is preferably concave with respect to the axis of rotation D. In this context, the curvature K can be formed in such a way, or the curved closure blade 5 can be arranged with respect to the axis of rotation D in such a way, that a portion of the closure blade 5 in the region of the second point P2 is oriented, at least substantially, perpendicular to the connecting line between the point P2 and the axis of rotation D, while a portion of the closure blade 5 in the region of the first point P1 is oriented obliquely with respect to the connecting line between the first point P1 and the axis of rotation D. As a result of this, the closure blade 5 can be inserted particularly easily into a flow of bulk material emerging from the second opening 4b, since the movement of the closure blade 5 in this case is, at least substantially, perpendicular to the direction of emergence of the bulk material from the second opening 4b and is not opposed to this direction of emergence.

In this context, the shape of the second opening 4b preferably corresponds to the shape of the closure blade 5, i.e. the second opening 4b can also have the curvature K. Therefore, in the first rotational position of the closure blade 5, a first point p1 on an edge of the second opening 4b is located opposite the first point P1 on the closure blade 5, while a second point p2 on the edge of the second opening 4b is located opposite the second point P2 on the closure blade 5. Here, a distance a1 between the first point p1 on the edge of the second opening 4b and the axis of rotation D is smaller than a distance a2 between the second point p2 on the edge of the second opening 4b and the axis of rotation D. In this context, the distances A1, A2 between the points P1, P2 on the closure blade 5 can correspond to the distances a1, a2 between the points p1, p2 on the edge of the second opening 4b and the axis of rotation D in such a way that, when the second opening 4b is uncovered, a uniform gap is created between the closure blade 5 and the second opening 4b, which allows the closure blade 5 to perform a pivoting movement without jamming.

Figure 2:
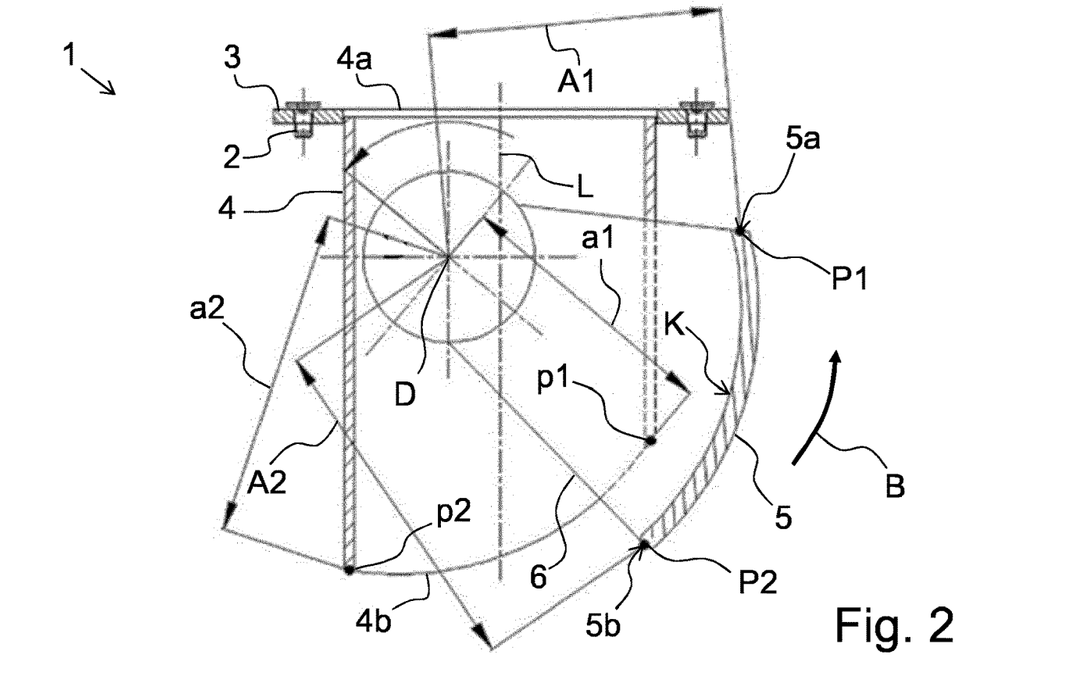
FIG. 2 is a cross-section view of the closure device of FIG. 1 in a different configuration.

FIG. 2 shows the closure device 1 of FIG. 1, whereby the closure blade 5 is in the second rotational position and the second opening 4b is therefore, at least partially, uncovered so that bulk material from the bulk material container 3 can emerge, through the bulk material guide 4, from the second opening 4b.

As can be seen from FIG. 2, when the closure blade 5 is pivoted from the first rotational position to the second rotational position, the gap between the closure blade 5 and the second opening 4b has increased, in particular continuously. In other words, in the second rotational position, the distance between the second point P2 on the closure blade 5 and the first point p1 on the edge of the second opening 4b is greater than the distance between the first point P1 on the closure blade 5 and the first point p1 on the edge of the second opening 4b in the first rotational position (cf. FIG. 1).

As a result of this, the bulk material which, when the second opening 4b is in the closed condition, rests on the closure blade 5 is given additional space when the second opening 4b is uncovered, i.e. when the closure blade 5 is pivoted out of the first rotational position, which additional space relieves the bulk material in the region of the second opening 4b. The particles of the bulk material are therefore no longer forced to rotate and/or to move due to contact with the closure blade 5 when the closure blade 5 is moved, which results in a reduced frictional force acting on the closure blade 5.

As can also be seen from FIG. 1, the axis of rotation D is arranged eccentrically with respect to the bulk material guide 4, in particular with respect to a longitudinal axis L of the bulk material guide 4. In particular, the axis of rotation D runs perpendicular to the longitudinal axis L, at a finite distance from the longitudinal axis L.

The eccentric arrangement of the axis of rotation D has the advantage that less space outside the bulk material guide 4 is occupied by the closure blade 5 or the lever arm 6 when the closure blade 5 is pivoted. In particular, in the second rotational position, the distance between the closure blade 5 and the bulk material guide 4 can be reduced as a result of this, as shown in FIG. 2.

Alternatively or additionally, the size of the gap arising between the second opening 4b and the closure blade 5 can also be adjusted by the eccentric arrangement of the axis of rotation D, and thus the frictional force which effectively comes into existence when the second opening 4b is uncovered can be influenced. Likewise, the overall movement of the closure blade 5 can be influenced by the position of the axis of rotation D, i.e. to what extent the closure blade 5 lifts off from the second opening 4b when the second opening 4b is uncovered and/or in which orientation the closure blade 5 is inserted into a flow of bulk material which emerges from the second opening 4b, or is guided through the flow of bulk material before the second opening 4b is completely closed.

Figure 3:
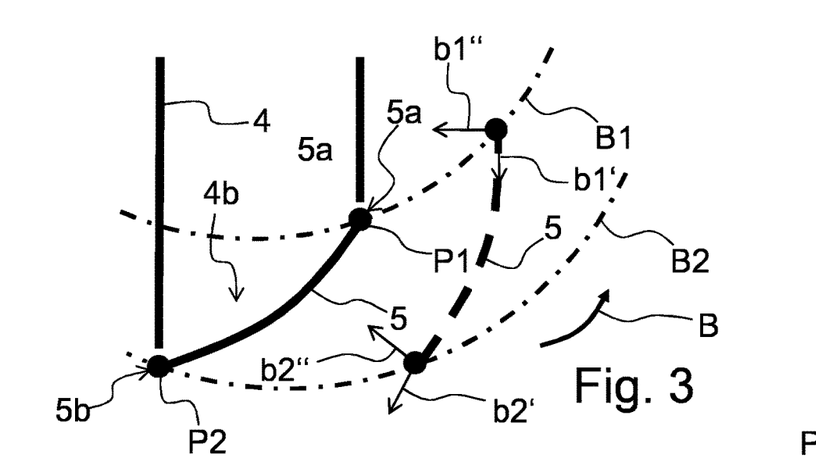
FIG. 3 is a schematic illustration of the rotational movement of a closure blade in accordance with a preferred embodiment of the invention.

FIG. 3 shows an illustration of the rotational movement of a closure blade 5 in accordance with the invention, in a preferred embodiment. Here, the closure blade 5 is represented by a solid line in a first rotational position, in which it closes a second opening 4b of a bulk material guide 4, while it is shown as a dashed line in a second rotational position, in which it does not cover the second opening 4b. In the interest of a clear representation, reference signs of the same or mutually corresponding elements are not shown for each of the elements.

When the closure blade 5 is transferred from the first rotational position to the second rotational position, the ends of the closure blade 5 move on different curves of movement B1, B2, which are represented by dash-dotted lines. In particular, a first point P1 which is located on a first edge 5a of the closure blade 5 moves on a first trajectory curve B1, while a second point P2 which is located on a second edge 5b of the closure blade 5 moves on a second trajectory curve B2. In this context, the first edge 5a is located at a foremost position in the direction of movement B of the closure blade 5 when the closure blade 5 is transferred from the first rotational position to the second rotational position, while the second edge 5b is located at a rearmost position.

The first point P1 and the second point P2 each have a movement component b1', b2' that is tangential to the closure blade 5 during the movement along the respective curve of movement B1, B2. This distinguishes the line of movement of the closure flap 5 from a pure flap type movement, in which the closure blade would move exclusively in a direction perpendicular to the closure blade.

However, since the closure blade 5 does not perform a pure crescent type movement in which the movement is exclusively tangential to the closure blade 5, each of the first point P1 and the second point P2 also have a movement component b1", b2" that is perpendicular to the closure blade during the movement along the respective curve of movement B1, B2. In this way, the lifting of the closure blade 5 from the second opening 4b is realized when the second opening 4b is uncovered, and jamming of the closure blade 5 is avoided.

Here, the second trajectory curve B2 is at a greater distance from an axis of rotation about which the closure blade 5 is pivoted than the first trajectory curve B1. In other words, the first trajectory curve B1 lies, at least in portions, further inwards with respect to the axis of rotation than the second trajectory curve B2. This enables the closure blade 5 to lift off at least substantially uniformly from the second opening 4b when the second opening 4b is uncovered, in order to avoid jamming of the closure blade 5. At the same time, the closure blade 5 also performs a movement which is at least substantially of a crescent type and which allows the second opening 4b to be closed even when bulk material is emerging from the second opening 4b.

Here, the first and second points P1, P2 preferably move on circular curves of movement B1, B2 about the axis of rotation fixed in space, whereby the radii of the curves of movement B1, B2 are defined by the distances of the first and second points P1, P2 from the axis of rotation. A second curve of movement B2 of the second point P2, which is located further away from the axis of rotation than the first curve of movement B1 of the first point P1, can therefore be achieved, for example, by an appropriate orientation of the closure blade 5 with respect to the axis of rotation D and/or an appropriate curvature of the closure blade 5 (cf. FIGS. 1 and 2).

Alternatively, it is also conceivable that the curves of movement B1, B2 are not circular. This can be achieved, for example, by moving the axis of rotation when the closure blade 5 is pivoted. In this case it is also not necessary for the points P1, P2 on the closure blade 5 to have different distances from the axis of rotation. When the axis of rotation is moved along a longitudinal axis of the bulk material guide 4, the overall movement of the closure blade 5 corresponds more closely to a scooping movement, for example, so that the second opening 4b can be uncovered yet more easily. However, in this case, closing the second opening 4b when bulk material emerges from the second opening 4b is more difficult since the closing blade 5 is being moved against the flow of bulk material.

Figure 4:
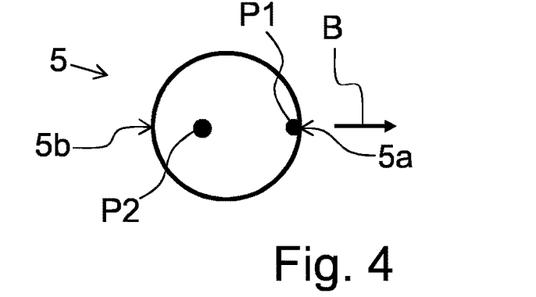
FIG. 4 is a plan view of a closure blade in accordance with one embodiment of the invention.

FIG. 4 shows, in a plan view, a preferred embodiment of a closure blade 5 in accordance with the invention, for closing a second opening of a bulk material guide.

Preferably, the closure blade 5 is adapted to the second opening of the bulk material guide, in particular with regard to its shape and/or its curvature, so that the second opening can be sealingly closed. In the example shown, the closure blade 5 is constructed in the shape of a disc so that it can close a second opening that is constructed to be round. Alternatively, however, it is also conceivable for the closure blade 5 to be constructed so as to be rectangular or, if desired, also polygonal, i.e. with multiple corners, for example as a hexagon or an octagon. In this context, the closure blade 5 can also have one or more curved edges.

The closure blade 5 has a first edge 5a which, when the closure blade is rotated about an axis of rotation, in particular when it is transferred from a first rotational position to a second rotational position (cf. FIGS. 1 and 2), is located at a foremost position in the resulting direction of movement B of the closure blade 5. The closure blade 5 has a second edge 5b which is opposite the first edge 5a and which, accordingly, is located at a rearmost position during this movement.

A first point P1 which moves on a first trajectory curve during the rotation of the closure blade 5 about the axis of rotation is located on the first edge 5a (cf. FIG. 3). The closure blade 5 also has a second point P2 which, with respect to the direction of movement B, lies behind the first point P1 and which moves on a second trajectory curve during the rotation of the closure blade 5. Here, the second point P2 does not necessarily need to lie on the second edge 5b.

Figure 5:
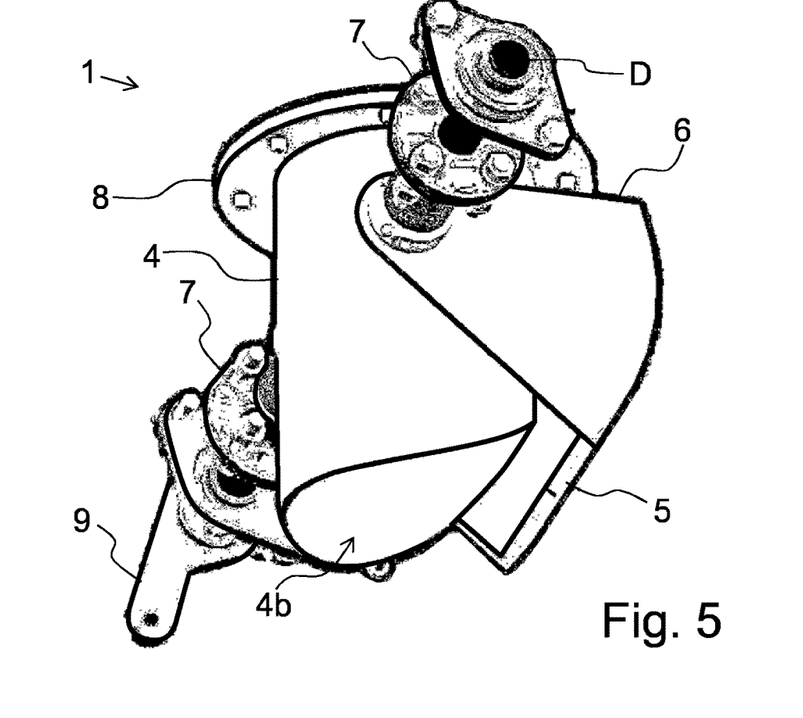
FIG. 5 is a three-dimensional perspective view of a preferred embodiment of a closure device of the invention.

FIG. 5 shows, in a three-dimensional representation, a preferred embodiment of a closure device 1 for a bulk material container in accordance with the invention. The closure device 1 comprises a bulk material guide 4 for discharging bulk material from the bulk material container via a second opening 4b. The bulk material guide 4 is connected to the bulk material container, for example it can be flange-mounted to the latter via a connecting flange 8. By loosening the connecting flange 8, the bulk material guide 4 can be exchanged, for example for a bulk material guide with a smaller second opening, in order to limit the maximum mass flow rate of bulk material through the bulk material guide, or for a bulk material guide with a larger second opening, in order to facilitate the guiding of bulk material having larger bulk material particles.

The second opening 4b can be closed by a closure blade 5 which is rotatably mounted about an axis of rotation D. In order to enable the second opening 4b to be closed in a sealing manner and at the same time to enable the closure blade 5 to lift off from the second opening 4b when the closure blade 5 is pivoted, the second opening 4b as well as the closure blade 5 are constructed in a curved fashion, in particular in an arched fashion. This ensures that a uniform gap is formed between the second opening 4b and the closure blade 5 and that the closure blade 5 does not simply slide along the second opening 4b when the second opening 4b is uncovered. In this way, jamming of the closure blade 5 by bulk material particles can reliably be prevented.

The axis of rotation D is defined by bearings 7 which are arranged on both sides of the bulk material guide 4. An actuating lever 9, which is connected to the axis of rotation D and which can be actuated, for example, by a hydraulic arrangement (not shown), enables rotation of the closure blade 5. Here, the closure blade 5 is connected to the axis of rotation D via a lever arm 6.

In a preferred manner, one or more components of the closure device 1, in particular the axis of rotation D, the bearings 7, the lever arm 6, the actuating lever 9 and/or the hydraulic arrangement can be arranged in a housing. In the interest of a clear representation, the housing is not shown here.

Figure 6:
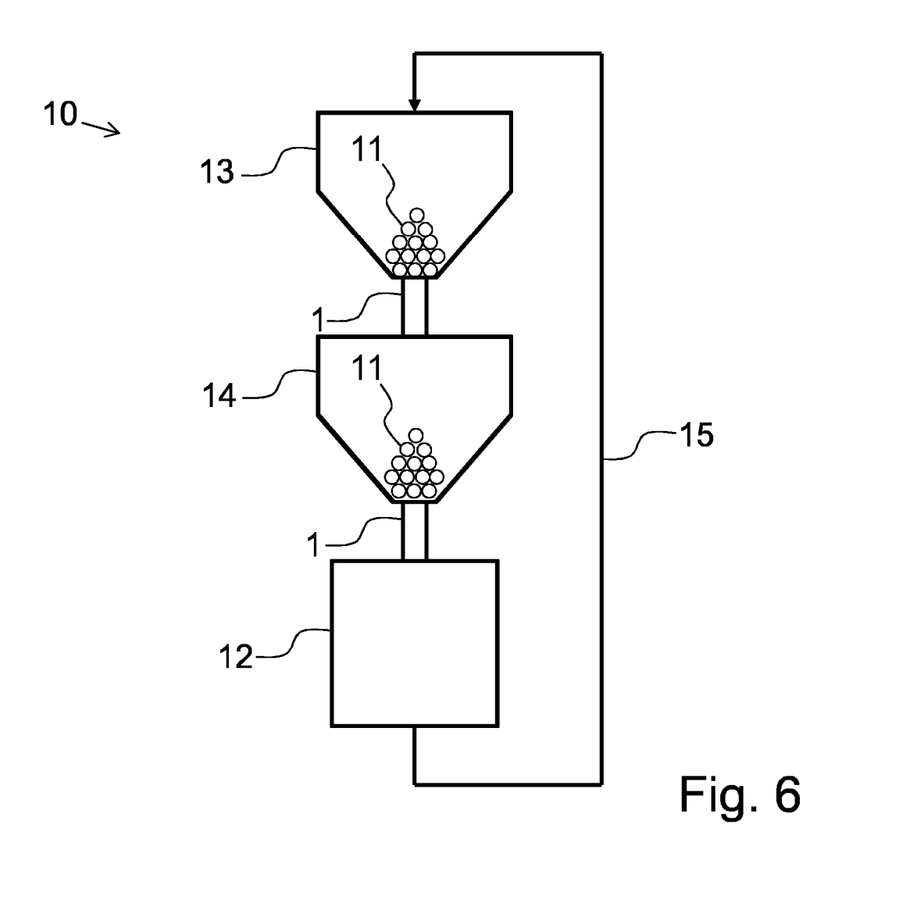
FIG. 6 is a schematic view showing use of a closure device in accordance with embodiments of the invention.

FIG. 6 shows a preferred example of use of a closure device 1 in accordance with the invention in a bulk material system 10, in which the bulk material is a heat transfer medium consisting of heat transfer particles 11. The bulk material system 10 shown in FIG. 6 is preferably used in the context of a pyrolysis process in which a carbonaceous starting material, such as biomass, is thermally decomposed in a pyrolysis reactor 12, thereby generating a pyrolysis gas.

In this context, the closure devices 1 are used to regulate the amount of heat transfer particles 11 in a preheater 13, in which the heat transfer particles 11 can be brought to a reforming temperature, in a reformer 14, in which a product gas can be generated from the pyrolysis gas at the reforming temperature, and/or in the pyrolysis reactor 12. By regulating the amount of heat transfer particles 11 in the reformer 14 and/or in the pyrolysis reactor 12, the effective temperature prevailing in the reformer 14 and/or in the pyrolysis reactor 12 can be influenced.

For example, a metered quantity of heat transfer particles 11 can be transferred from the preheater 13, in which the heat transfer particles 11 are arranged in the form of a bed on the base of the preheater 13 and through which, for example, hot combustion exhaust gases flow for the purpose of heating, into the reformer by pivoting a closure blade of the closure device 1 below the preheater 13, which reformer is thereby heated to the reforming temperature. The heat transfer particles 11 which have been transferred from the preheater 13 into the reformer 14 accumulate on the base of the reformer 14, preferably also in the form of a bed through which pyrolysis gas generated in the pyrolysis reactor 12 and transferred into the reformer 14 can flow.

In the course of this, the pyrolysis gas is converted to a product gas, which is discharged separately from the reformer 14. In this process, the heat transfer particles 11 cool down on the base of the reformer 14. In order to maintain the reforming temperature in the reformer 14, at least part of the cooled heat transfer particles 11 in the reformer can be transferred, by pivoting a closure blade of the closure device 1 arranged below the reformer 14, to the pyrolysis reactor 12, where the remaining thermal energy which is stored in the cooled heat transfer particles 11 can be used for the thermal decomposition of the starting material. At the same time, further heat transfer particles 11 which have been preheated to the reforming temperature can be fed from the preheater 13 into the reformer 14.

The heat transfer particles 11, in particular once they have further cooled down after the decomposition of the starting material, are returned, via a conveying device 15, to the preheater 13, where they can again be heated to the reforming temperature.

While at least one example embodiment has been described above, it is to be noted that a large number of variations thereto exist. It should also be noted that the example embodiments described herein only illustrate non-limiting examples, and that it is not intended thereby to limit the scope, the applicability, or the configuration of the devices and methods described herein. Rather, the preceding description will provide the person skilled in the art with instructions for implementing at least one example embodiment, whereby it is to be understood that various changes in the functionality and the arrangement of the elements described in an example embodiment can be made without deviating from the subject matter respectively set forth in the appended claims as well as its legal equivalents.

What is claimed is:

1. A device for carrying out a pyrolysis process in which a carbonaceous starting material is thermally decomposed and, in the process, a pyrolysis gas is produced; wherein the device is constructed as a bulk material system for a heat transfer medium consisting of heat transfer particles as bulk material, and wherein the bulk material system comprises:
   a pyrolysis reactor for thermally decomposing the carbonaceous starting material by pyrolysis in order to produce a pyrolysis gas;
   a preheater for preheating the heat transfer particles in which the heat transfer particles are brought to a reforming temperature;
   a reformer for generating a product gas from the pyrolysis gas at the reforming temperature; and
   a closure device for the bulk material system for regulating an amount of heat transfer particles in the preheater, in the reformer or in the pyrolysis reactor; wherein the closure device comprises:
      a bulk material guide in the form of a hollow body with a first opening for connection to the bulk material system and a second opening for a discharge of a bulk material guided by the bulk material system; and
      a closure blade which is rotatably mounted about an axis of rotation and which, in a first rotational position, closes the second opening and which, in a second rotational position, at least partially uncovers the second opening;
   wherein the closure blade is mounted in such a way that, during a rotation about the axis of rotation to be transferred from the first rotational position to the second rotational position, a first point on a first edge of the closure blade and that, with respect to a direction of movement, is located at a foremost position, moves on a first trajectory curve, and a second point on the closure blade which, as regards a spatial position with respect to the direction of movement, is located behind the first point, moves on a second trajectory curve, which, at least in portions, is at a greater distance from the axis of rotation than the first trajectory curve; and
   wherein, at all times during the movement along the first and second trajectory curves, the first and second points each have a movement component that is tangential to the closure blade along a tangent which touches the closure blade respectively in the first point or in the second point.

2. The device of claim 1, wherein the closure blade is arranged with respect to the axis of rotation in such a way that a distance between the second point on the closure blade and the axis of rotation is greater than a distance between the first point on the closure blade and the axis of rotation.

3. The device of according to claim 1, wherein the closure blade is curved or deformed in such a way that a distance between the second point on the closure blade and the axis of rotation is greater than a distance between the first point on the closure blade and the axis of rotation.

4. The device of claim 1, wherein the closure blade is curved and/or arranged with respect to the axis of rotation in such a way that, during rotation about the axis of rotation, the closure blade sweeps through a region of space that is at least substantially entirely between the first trajectory curve and the second trajectory curve.

5. The device of claim 1, wherein the bulk material guide is constructed in such a way that a distance between a second point on an edge of the bulk material guide bounding the second opening, which in the first rotational position of the closure blade, corresponds with the second point on the closure blade, and the axis of rotation is greater than a distance between a first point on the edge of the bulk material guide bounding the second opening, which, in the first rotational position of the closure blade, corresponds with the first point on the closure blade, and the axis of rotation.

6. The device of claim 1, wherein the bulk material guide and/or the closure blade is or are constructed in such a way that a shape of the second opening corresponds, at least in portions, with a shape of the closure blade.

7. The device of claim 1, wherein the bulk material guide has a longitudinal axis which extends centrically within the bulk material guide between the first opening and the second opening, and the axis of rotation is arranged in such a way that it does not intersect the longitudinal axis.

8. The device of claim 1, wherein the bulk material guide is interchangeable for controlling a maximum mass flow rate of bulk material through the closure device.

9. The device of claim 2, wherein the closure blade is curved or deformed in such a way that the distance between the second point on the closure blade and the axis of rotation is greater than the distance between the first point on the closure blade and the axis of rotation,
wherein the closure blade is curved and/or arranged with respect to the axis of rotation in such a way that, during rotation about the axis of rotation, the closure blade sweeps through a region of space that is at least substantially entirely between the first trajectory curve and the second trajectory curve,
wherein the bulk material guide is constructed in such a way that the distance between a second point on an edge of the bulk material guide bounding the second opening, which in the first rotational position of the closure blade, corresponds with the second point on the closure blade, and the axis of rotation is greater than the distance between a first point on the edge of the bulk material guide bounding the second opening, which in the first rotational position of the closure blade, corresponds with the first point on the closure blade, and the axis of rotation,
wherein the bulk material guide and/or the closure blade is or are constructed in such a way that a shape of the second opening corresponds, at least in portions, with a shape of the closure blade,
wherein the bulk material guide has a longitudinal axis which extends centrically within the bulk material guide between the first opening and the second opening, and the axis of rotation is arranged in such a way that it does not intersect the longitudinal axis, and
wherein the bulk material guide is interchangeable for controlling a maximum mass flow rate of bulk material through the closure device.

* * * * *